J. E. BAIN.
WATER SOFTENER.
APPLICATION FILED JULY 19, 1909.

989,942.

Patented Apr. 18, 1911.
2 SHEETS—SHEET 1.

WITNESSES
L. B. Woerner.
Wm Hurte.

INVENTOR,
John E. Bain,
By Minturn Woerner,
Attys.

J. E. BAIN.
WATER SOFTENER.
APPLICATION FILED JULY 19, 1909.
989,942.
Patented Apr. 18, 1911.
2 SHEETS—SHEET 2.
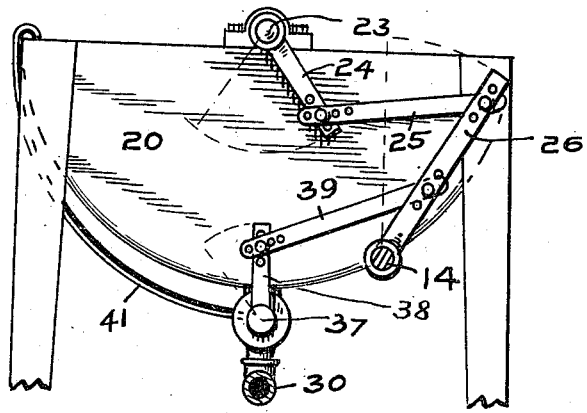
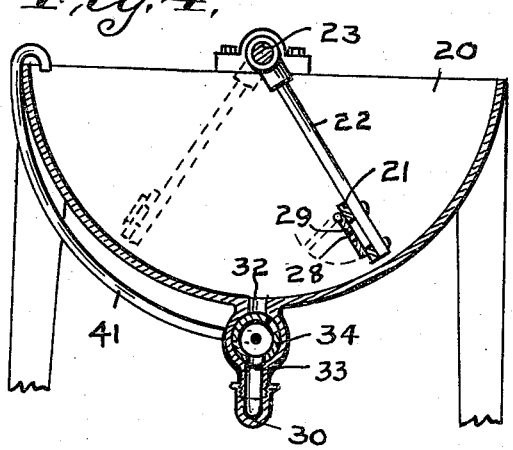
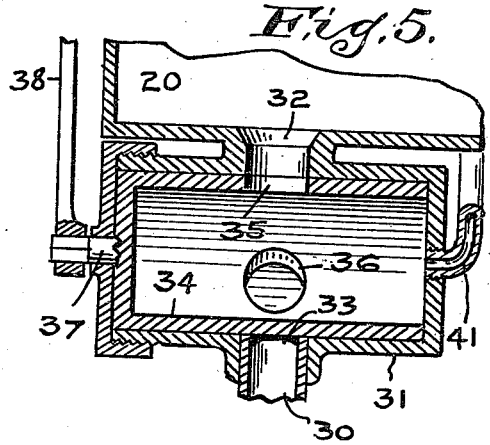
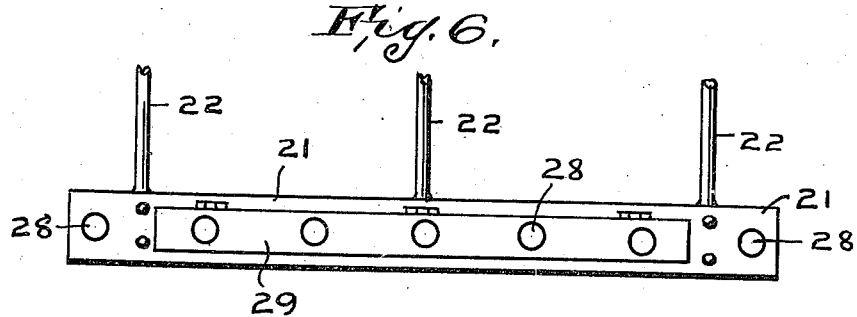
WITNESSES:
L. B. Woerner.
Wm Hurte
INVENTOR:
John E. Bain,
By Minturn & Woerner
Attys,

# UNITED STATES PATENT OFFICE.

JOHN E. BAIN, OF MONTPELIER, INDIANA, ASSIGNOR TO THE NATIONAL WATER SOFTENER COMPANY, OF MUNCIE, INDIANA, A CORPORATION OF INDIANA.

WATER-SOFTENER.

989,942.

Specification of Letters Patent. Patented Apr. 18, 1911.

Application filed July 19, 1909. Serial No. 508,458.

*To all whom it may concern:*

Be it known that I, JOHN E. BAIN, a citizen of the United States, residing at Montpelier, in the county of Blackford and State of Indiana, have invented certain new and useful Improvements in Water-Softeners, of which the following is a specification.

This invention relates to improvements in apparatus for automatically adding chemicals to water to relieve it as much as possible from deleterious substances which tend to render the water injurious to the mechanism with which it is used. It is applicable for use in softening water for laundry purposes and for removing those substances which form a scale on boiler shells during the generation of steam.

The invention consists primarily of a tank containing the supply of chemical mixture having a stirring means mounted therein; means for discharging a regulated quantity of said mixture into a receiving tank; a tilting vessel discharging into said receiving tank when filled with a predetermined weight of water and mechanism actuated by the tilting vessel for moving the stirring means and for opening and closing the discharge from the chemical supply holding tank.

My object is to provide a novel and peculiarly efficient and reliably-operating tilting attachment of the character and for the purposes stated, of simple construction whereby skilled supervision is obviated, and to provide means for regulating the capacity of the machine to the varying requirements of a business.

To this end my invention consists in the general construction of my improved device, and it also consists in the details of construction and combinations of parts embodying the invention mentioned in its preferred form as to details, illustrated in the accompanying drawings, in which—

Figure 1:
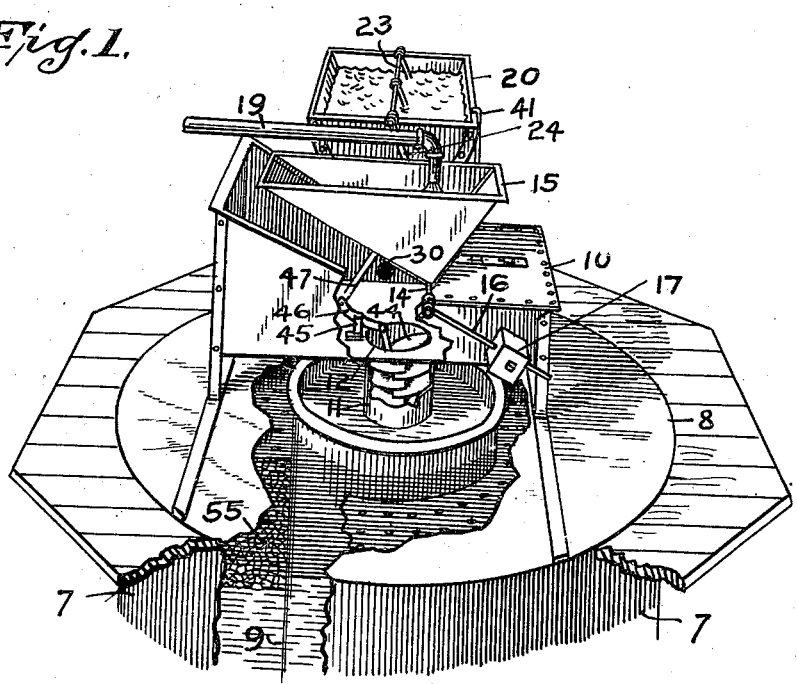
Figure 2:
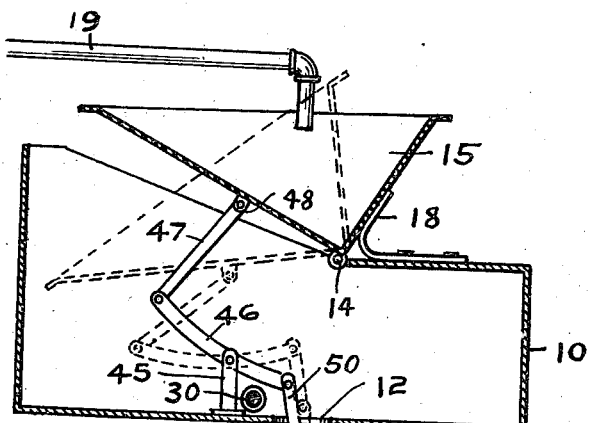

Figure 1 is a view in perspective of my invention in operative position on top of a precipitating tank, portions of the various parts being broken away in this figure to illustrate the underlying parts. Fig. 2 is a detail in vertical section through the agitating tube, mixing chamber, and dumping bucket, showing the bucket empty and in position to be filled. Fig. 3 is a detail in vertical section on a plane passing between the solution tank and the mixing chamber close to the latter and showing the mixing chamber in end elevation, together with the mechanism for operating the measuring valve and the solution stirrer. Fig. 4 is a vertical transverse section through the solution tank and measuring valve. Fig. 5 is a detail in longitudinal vertical section of the measuring valve and Fig. 6 is a detail in side elevation of the lower end of the solution stirrer.

Like characters of reference indicate like parts throughout the several views of the drawings.

7 is the outer wall of a precipitating tank and 8 the top of said tank.

9 represents the inner tube or down-spouting of the precipitating tank.

10 is a mixing chamber which is supported on suitable legs upon the top 8, and 11 is an agitating tube leading from an opening 12 in the bottom of the mixing chamber 10, and discharging into the top of the inner tube 9. A chemical solution deposited in the mixing chamber 10, and a measured quantity of untreated or "raw" water deposited in said mixing chamber at the same time as the chemical solution, are mixed in said chamber and the resulting mixture is then discharged through the agitating tube 11 into the inner tube 9 of the precipitating tank.

Mounted in suitable boxes supported by the sides of the mixing chamber 10 is a rock-shaft 14 and on the rock-shaft 14 a dumping bucket 15 is mounted so as to tilt with the rocking of said shaft. The center of gravity of the bucket and also of its contents when filled with water is at one side of the rock-shaft 14 which causes the bucket to assume the position by gravity, shown in dotted lines in Fig. 2, which permits water that may be contained in the bucket to discharge therefrom into the mixing chamber 10. A normal position of the bucket 15, such as is shown by the full lines in the drawings, is maintained by means of an arm 16 which is rigidly attached to the rock-shaft 14 and extends laterally of said shaft in an opposite direction from the major portion of bucket 15. Mounted on the arm 16 is a weight 17 which is adjustable longitudinally of said arm. The quantity of water in bucket 15 required to dump and empty the latter is determined by the position of the weight 17 on the arm 16, and the adjustment of said weight on the arm provides a means for regulating the quantity of water which is emptied at each dumping of the bucket into the mixing chamber 10. Water is supplied from any suitable source, to the bucket 15, through the pipe 19.

20 is the solution tank which contains a supply of chemicals in solution which is to be discharged in regulated quantities into the mixing chamber 10 each time that the water in the bucket 15 is dumped into said chamber. The bottom of the solution tank 20 will preferably be half round in cross section to enable a stirring blade 21 carried by arms 22 which are mounted on a rock-shaft 23 to sweep the bottom and thus prevent the settling of the chemical mixture. The rock-shaft 23 carries an arm 24 which is connected by the link bar 25 with an arm 26 mounted on the adjacent end of the rock-shaft 14, whereby, by the rocking of shaft 14 due to the water dumping operations above described, the shaft 23 will be rocked and the chemical mixture stirred by the travel of the blade 21. The blade 21 will preferably be provided with perforations 28 to more thoroughly agitate the mixture. As the motion imparted to the chemical solution or mixture by the first movement of the blade has a tendency to interfere with the return travel of the latter and to retard it by the current thus caused, I prefer to form a long longitudinal slot in the blade which will permit the solution to pass through on said return travel, but during the opposite or first travel the slot is closed by a door 29 which is hinged above the opening. In the first travel of the blade as impelled by the weight of water in the bucket 15 which is being dumped, the resistance of the chemical solution in tank 20 will close the door 29. The door 29 will be provided with perforations 28 as described for the blade 21.

Located at the bottom of the solution tank 20 near its inner end is a discharge opening which empties into a pipe 30 through a measuring valve which measures the quantity of chemical mixture intermittently discharged through said pipe. The pipe 30 discharges into the mixing chamber 10 near the bottom of the latter as shown at 30 in Figs. 1 and 2. The measuring valve comprises an external cylinder 31 having an inlet opening through its upper side wall which communicates with the discharge opening 32 at the bottom of the solution tank 20. The external cylinder 31 also has an outlet opening 33 through its bottom wall which communicates with the pipe 30. Located within the cylinder 31 is a close fitting cylinder 34 which has two openings 35 and 36 adapted to be brought alternately into register with openings 32 and 33 respectively of the outer cylinder 31 by a rocking movement of said cylinder 34. This inner cylinder 34 has a short shaft 37 at one end which extends through a suitable opening in the outer end of cylinder 31, and is connected with an arm 38 and attached in a manner to rock the cylinder 34 by a swinging movement of said arm for the purpose of bringing its openings 35 and 36 alternately into register with the openings 32 and 33 in the outer cylinder. The arm 38 is connected by means of a link bar 39 with the arm 26 on rock-shaft 14, previously described, and the rocking of shaft 14 caused by the dumping of the weight of water in the bucket 15 operates the above described measuring valve through arm 26, link bar 39 and arm 38. An air vent in the inner cylinder 34 is provided through the outer end of the inner and outer cylinders, and to prevent leakage through said air vent I provide a small tube 41 which passes up on the outside of the solution tank 20 and discharges into said tank. The inner cylinder 34 of the measuring valve is in communication with the solution tank 20 during the time that the dumping bucket 15 is being filled through the pipe 19 and when the bucket 15 is full and ready to dump the measuring valve is also full of chemical solution and its measured quantity is discharged into the mixing chamber 10 simultaneously with the discharge of the water into said chamber. The agitation caused by the rush of the water dumped from bucket 15 into the mixing chamber 10 causes the water and chemical to be thoroughly mixed. During this mixing period the opening 12 into the agitating tube 11 is closed by a valve-plate 44 hinged to the under side of the bottom of the mixing chamber 10 so as to swing downwardly to open the discharge 12 and to move up into contact with said bottom under the hole 12 to close the latter. The opening and closing of the valve-plate 44 is accomplished automatically by the movement of the dumping bucket 15 through the following described mechanism, reference being had particularly to Fig. 2.

45 is a vertical standard or post resting upon the bottom of the mixing chamber 10.

46 is a lever pivotally supported by the post 45. The upper end of lever 46 is connected with ears 48 on the under side of the bucket 15 by means of the link bar 47 and the lower end of the lever 46 is connected with the ears 49 on the valve-plate 44 by the link bar 50. The full lines in Fig. 2 show the valve-plate in open position and its operative parts correspondingly placed and the dotted lines in this figure show the positions of said parts when the bucket is in position for discharging its water, which position is also shown in dotted lines.

In order to more thoroughly agitate and mix the water and chemical solution coming from the mixing chamber 10 I provide a series of baffle plates 54 in the agitating tube 11. These plates are horizontal and are arranged one above the other and extend over one-half of the cross sectional area of tube 11 whereby the inner straight edges of the plates overlap each other causing the mixed water and chemicals to take a zig-zag course through the tube 11 which additionally agitates and mixes the chemicals with the water. On reaching the down-spouting or inner tube 9 of the precipitating tank, the water and reagents are so thoroughly mixed that the hardening elements and softening solution unite in the form of insoluble flakes, which are carried with the descending water slowly to the bottom of the precipitating tank 7. After passing out through the bottom of the down-spouting 9 the water moves slowly upward in the precipitating tank 7 and as it moves the reaction is continued and all remaining suspended matter becoming still more solid and heavy, begins to descend and as it falls it meets and unites with any rising particles and carries them in the form of thoroughly precipitated matter to the bottom of tank 7. The water continues its upward travel and passes through a filter 55 (Fig. 1) which removes from it any remaining traces of impurity. The result is clear and practically pure soft water which flows off by gravity and the precipitated matter at the bottom of tank 7 may be occasionally drawn off and removed.

As will be understood, the relative capacity of the measuring valve and various tanks and compartments of the apparatus may be varied according to the particular requirements, and while the construction of my improved apparatus is the best now known to me, it may be variously modified by those skilled in the art without departure from my invention.

Having thus fully described my invention what I claim as new and wish to secure by Letters Patent of the United States, is—

1. In a water purifier of the class described, the combination of a tank adapted to contain a chemical solution, a receiving tank, means for discharging a regulated quantity of chemical solution into said receiving tank, a tilting receptacle discharging into said receiving tank said receiving tank having a discharge opening, an agitating tube into which said last opening discharges, a valve to open and close said discharge opening and means operated by the tilting receptacle for opening and closing said valve.

2. In a water purifier of the class described, the combination of a tank adapted to contain a chemical solution, a receiving tank, means for discharging a regulated quantity of the chemical solution into said receiving tank, a tilting receptacle discharging into said receiving tank, means for supplying water to said tilting receptacle, said receiving tank having a discharge opening, an agitating tube into which said opening discharges means for closing said discharge opening as the tilting receptacle discharges and baffle plates located in said agitating tube.

3. In a water purifier of the class described, the combination of a tank adapted to contain a chemical solution, stirring means movably mounted therein, a receiving tank, means for discharging a regulated quantity of a chemical solution into said receiving tank. a tilting receptacle discharging into said receiving tank, an agitating tube under said receiving tank said tank having a discharge opening into said agitating tube, a valve to open and close said opening, and means actuated by the tilting receptacle for moving the stirring means and for opening and closing the discharge from the chemical supply holding tank and the valve from the receiving tank to the agitating tube.

4. In a water purifier of the class described, a tank adapted to contain a chemical solution, a receiving tank, a pipe leading from the first tank and discharging into the second tank, a valve controlling the discharge through said pipe, said valve comprising an outer cylinder with a top and a bottom opening and an inner cylinder with openings adapted to be brought alternately opposite each opening of the outer cylinder, an arm carried by the cylinder, an air vent to said valve, a tube from said vent terminating above the highest level of the chemical solution in the solution tank, a rock shaft mounted on the second tank, a receptacle adapted to tilt carried by said shaft and emptying into the second tank when tilted, a weighted arm also carried by said shaft, a second arm carried by said shaft, means for supplying water to the receptacle and a bar connecting said second arm of the shaft with the said arm of the cylinder whereby by the rocking of the shaft the inner cylinder of said valve will be rocked.

5. In a water purifier of the class described, a tank adapted to contain a chemical solution, a rock shaft supported by said tank having a stirring-blade depending therefrom, a second tank below the first tank, a discharge from the first tank into the second tank directly, a valve controlling said discharge, said valve comprising an outer cylinder with top and bottom openings and an inner cylinder with openings adapted to be brought alternately opposite the openings of the outer cylinders, a rock shaft carried by the second tank, a receptacle mounted on said rock shaft and emptying directly into the second tank when tilted, a weighted arm also carried by said last rock shaft, means for supplying water to the receptacle and means by the rocking of the second rock shaft for rocking the cylinder of said valve and for rocking the shaft of the tank containing the chemical solution to move the mixer in said first tank, said means comprising an arm carried by the second rock shaft, arms carried by the cylinder of the valve and first rock shaft respectively, and bars connecting the last two arms with the arm of the second rock shaft.

In witness whereof, I have hereunto set my hand and seal at Montpelier, Indiana, this 7th day of May, A. D. one thousand nine hundred and nine.

JOHN E. BAIN. [L. S.]

Witnesses:
GUY A. BRACKIN,
BEN M. WELLS.

Copies of this patent may be obtained for five cents each, by addressing the "Commissioner of Patents, Washington, D. C."